US011882780B2

(12) United States Patent
Hertzog et al.

(10) Patent No.: US 11,882,780 B2
(45) Date of Patent: Jan. 30, 2024

(54) AGRICULTURAL SYSTEM

(71) Applicant: CNH Industrial America LLC, New Holland, PA (US)

(72) Inventors: Daniel Hertzog, Blackstad (SE); Bengt Per-Inge Linderson, Odensvi (SE); Per Dennis Wallin, Västervik (SE); Carl Ola Fredrik Nilsson, Västervik (SE); Robert Svensson, Västervik (SE); Rickard Karl Gustav Nåhdin, Gamleby (SE)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 373 days.

(21) Appl. No.: 16/847,880

(22) Filed: Apr. 14, 2020

(65) Prior Publication Data

US 2020/0337208 A1    Oct. 29, 2020
US 2023/0255127 A9    Aug. 17, 2023

(30) Foreign Application Priority Data

Oct. 18, 2019  (EP) ..................................... 19171233
Oct. 18, 2019  (EP) ..................................... 19204069

(51) Int. Cl.
 *A01B 69/04*   (2006.01)
 *A01B 79/00*   (2006.01)
 *A01B 63/24*   (2006.01)
 *A01B 63/00*   (2006.01)
 *A01B 3/24*    (2006.01)

(52) U.S. Cl.
 CPC .............. *A01B 61/044* (2013.01); *A01B 3/24* (2013.01); *A01B 63/004* (2013.01);
 (Continued)

(58) Field of Classification Search
 CPC ........... A01B 61/044; A01B 3/24; A01B 3/28; A01B 63/004; A01B 63/008;
 (Continued)

(56) References Cited

U.S. PATENT DOCUMENTS 6,041,582 A  *  3/2000  Tiede et al. .......... A01B 79/005
                                                56/10.2 A
6,061,617 A     5/2000  Berger et al.
        (Continued)

FOREIGN PATENT DOCUMENTS

DE       4232067 A1    4/1993
DE   102015111518 A1   1/2017
        (Continued)

OTHER PUBLICATIONS

Extended European Search Report for EP Application No. 19172330 dated Nov. 6, 2019 (seven pages).
(Continued)

*Primary Examiner* — Tara Mayo-Pinnock
(74) *Attorney, Agent, or Firm* — Rebecca Henkel; Rickard K. DeMille

(57) ABSTRACT

An agricultural system comprising a plough. The plough comprising: a plough body; a stone-trip-mechanism that is configured to be tripped when the plough body encounters a stone or other obstruction; and a trip-sensor configured to provide trip-data in response to the stone-trip-mechanism being tripped. The agricultural system also includes a location-determining-system associated with the plough, wherein the location-determining-system is configured to provide location-data that is representative of a location of the plough; and a controller. The controller is configured to: receive the trip-data; and store location-data provided by the location-determining-system as a trip-location based on the trip-data, wherein the trip-location is a location of the plough at the time that the stone-trip-mechanism is tripped.

12 Claims, 10 Drawing Sheets

(51) Int. Cl.
  *A01B 61/04*    (2006.01)
  *A01B 63/32*    (2006.01)
  *A01B 3/28*     (2006.01)
  *A01B 15/02*    (2006.01)
(52) U.S. Cl.
  CPC .......... *A01B 63/008* (2013.01); *A01B 63/245* (2013.01); *A01B 63/32* (2013.01); *A01B 69/008* (2013.01); *A01B 79/005* (2013.01); *A01B 3/28* (2013.01); *A01B 15/02* (2013.01)
(58) Field of Classification Search
  CPC ..... A01B 63/245; A01B 63/32; A01B 69/008; A01B 79/005; A01B 15/02
  See application file for complete search history.

(56) References Cited

U.S. PATENT DOCUMENTS

| | | |
|---|---|---|
| 6,070,673 A | 6/2000 | Wendte |
| 9,717,178 B1 | 8/2017 | Sauder et al. |
| 2012/0237083 A1* | 9/2012 | Lange et al. ............ G06F 16/29 382/103 |
| 2015/0264857 A1 | 9/2015 | Achen et al. |
| 2016/0100517 A1 | 4/2016 | Bassett et al. |
| 2018/0310465 A1 | 11/2018 | Peterson |
| 2019/0174667 A1 | 6/2019 | Gresch et al. |
| 2020/0337202 A1 | 10/2020 | Hertzog et al. |

FOREIGN PATENT DOCUMENTS

| | | |
|---|---|---|
| WO | 2017011053 | 1/2017 |
| WO | 2017049186 | 3/2017 |
| WO | 2020113284 | 6/2020 |

OTHER PUBLICATIONS

Extended European Search Report for EP Application No. 19204069.9 dated May 29, 2020 (nine pages).

* cited by examiner

Force 467

AGRICULTURAL SYSTEM

BACKGROUND OF THE INVENTION

The present disclosure relates to an agricultural system, particularly, but not exclusively, to an agricultural system that includes a plough and a method of operating an agricultural system.

In agriculture, farming cycles are followed that can roughly be divided into the different steps of land preparation, seed sowing, fertilizing, irrigation, crop growth, and harvesting. Each of these steps is critical to yield optimal crop results and achieve the desired returns on initial investments. Of the listed steps, land preparation is typically further divided into steps of, as necessary, clearing obstructions (e.g. bushes, stones and rocks) and subsequent tillage.

Tilling crumbles and loosens the soil, improves the soil structure and incorporates crop residues and manure into the soil, thus fertilizing the ground. The improved soil structure allows for increased plant root growth, soil aeration and water penetration/filtration. Overall this results in higher yields, better long-term soil fertility, soil moisture retention, and weed management. Tillage can be separated into primary (relatively deep) and secondary (relatively shallow) tillage. In primary tillage, such as ploughing, the soil is turned over such that nutrients come to the surface. In addition to turning up the soil to bring fresh nutrients to the top and depositing plant residue below where it will break down, this process also aerates the earth—enabling it to hold more moisture. Preparing the land to a greater depth produces a rougher surface finish than secondary tillage. Secondary tillage (e.g. seedbed cultivation) breaks up soil clods into smaller masses which might be desirable for small seeds or plants that have minimal clod-handling ability.

Primary tillage, and particularly ploughing, is widely regarded as one of the most effective ways of preventing crop disease, removing weeds, and controlling mice and other pests. In its simplest form the turnplough, also known as the mouldboard plough, includes a variety of plough bodies, which are blades for penetrating and turning over the soil in arrays of adjacent trenches, known as furrows. Modern ploughs typically include a plurality of plough bodies connected to a plough frame such that they are laterally offset manner from each other when the plough is in use. Each plough body is connected to the plough frame via corresponding beams. The plough frame, in turn, is connected to a towing or pushing vehicle via a hitch arranged at a front or back end of the frame.

Depending on the density of the soil, a working depth of the plough bodies can be adjusted. For instance, the plough bodies working depth may be shallow in harder (dense) soils, whereas a deeper working depth may be applied in softer (less dense) soils. The plough bodies can be rigidly attached to the main frame, such that their distance from the main frame remains constant. Accordingly, the working depth of the ploughs are then adjusted by varying the ground clearance of the main frame. If the main frame is brought closer to the ground surface, the ground clearance is reduced, and the plough bodies penetrate deeper into the soil. Similarly, if the main frame is lifted further off the ground, the ground clearance is increased and the plough bodies are lifted, thereby reducing the working depth.

The ground clearance of the main frame may be controlled by one or more depth wheels. The one or more depth wheels may be connected to any part of the main frame such as the rear end of the main frame. An adjustable linkage may be provided between the main frame and the depth wheel to allow for changes in the distance between the depth wheel and the main frame. During ploughing, the depth wheel runs on the ground surface and supports the weight of the plough. If the distance between the depth wheel and the main frame is reduced, then the ground clearance between the main frame and the ground surface reduces accordingly. On the other hand, if the distance between the depth wheel and the main frame is increased, the ground clearance of the main frame increases. As outlined before, changing the main frame's ground clearance results in a variation of the plough body working depth.

Most modern ploughs are of the reversible type, in which the main frame is rotatable by 180 degrees (i.e. reversed) with respect to the headstock. A turning cylinder attached to the headstock may be used to rotate (reverse) the plough. During rotation of the main frame, a first set of plough bodies, which was initially arranged below the main frame (first configuration), is transferred to the top of the main frame. At the same time, a second set of plough bodies, which was initially arranged on top of the main frame, is then transferred to a position below the main frame. The reversible plough is then in its second configuration. The main frame may be repeatedly rotated (reversed) between the first and second configuration, particularly during turning manoeuvres on the headlands. Whenever the plough is reversed, the first and second set of plough bodies swap position.

In reversible ploughs, a means of adjusting the working depth of the plough bodies (i.e. the main frame) is required for both configurations of the reversible plough. There are mainly two types of depth control wheels for reversible ploughs. A first type includes a single pivoting depth wheel, which is used in both configurations of the reversible plough. The single pivoting depth wheel has to be moved from one side of the main frame to the other during reversal. This side transfer of the single depth wheel may be achieved by swinging the latter from one side to the other.

A second solution avoids the need for a movement of the depth adjustment wheel from one side to the other. In this second alternative, two separate depth wheels may be fixed to the main frame. A first depth wheel can be arranged on a first side of the main frame and a second depth wheel may be arranged on the second, opposite side of the main frame. Each of the two wheels is then only utilised in one configuration of the plough.

SUMMARY OF THE INVENTION

Aspects and embodiments of the disclosure provide an agricultural system as claimed in the appended claims.

According to one aspect of the current disclosure, there is provided an agricultural system comprising:
  a plough, the plough comprising:
  a plough body;
  a stone-trip-mechanism that is configured to be tripped when the plough body encounters a stone or other obstruction; and
  a trip-sensor configured to provide trip-data in response to the stone-trip-mechanism being tripped;
  a location-determining-system associated with the plough, wherein the location-determining-system is configured to provide location-data that is representative of a location of the plough; and
  a controller that is configured to:
  receive the trip-data when the stone-trip-mechanism is tripped; and store location-data provided by the location-determining-system as a trip-location based on the trip-data, wherein the trip-location is a location of the plough at the time that the stone-trip-mechanism is tripped.

Advantageously, such a system can enable the locations of stones or other obstacles that are encountered by the plough to be stored in memory. In this way, a subsequent agricultural operation in the field can be performed more effectively by taking into account the locations of the stones/obstacles.

The trip-sensor may be configured to directly or indirectly monitor the position of the plough body and/or the speed with which the plough body leaves it's working position in order to provide the trip-data.

The controller may be configured to: determine a plough-body-location based on the trip-location, wherein the plough-body-location represents the location of the plough body at the time that the stone-trip-mechanism is tripped; and store the plough-body-location.

The controller may be configured to determine if two trip-locations are less than a threshold-distance apart, and if they are then attribute a same stone-identifier to each of the two trip-locations.

The trip-data may comprise trip-depth-data, which may represent the depth of the plough body during the trip.

According to another aspect of the current disclosure, there is provided an agricultural system comprising:
an agricultural implement, the agricultural implement comprising:
an actuator configured to control operation of the agricultural implement;
a location-determining-system associated with the agricultural implement, wherein the location-determining-system is configured to provide implement-location-data that is representative of a current location of the agricultural implement; and
a controller that is configured to:
receive one or more trip-locations, wherein the one or more trip-locations are locations of a plough at a time that a stone-trip-mechanism has tripped in an earlier agricultural operation;
receive the implement-location-data; and
process the implement-location-data and the one or more trip-locations in order to provide an actuator-control-signal to the actuator in order to control the operation of the actuator.

The agricultural implement may comprise a ground engaging tool; and
the controller may be configured to:
determine a ground-engaging-tool-location based on the implement-location-data, wherein the ground-engaging-tool-location represents a current location of the ground engaging tool; and
process the ground-engaging-tool-location and the one or more trip-locations in order to provide the actuator-control-signal to the actuator for controlling the operation of the actuator.

The agricultural implement may be a plough. The plough may comprise a plough body. The actuator may comprise a stone-trip-actuator for applying a bias force to the plough body such that it is biased towards a working position. The actuator-control-signal may be configured to decrease the bias force that is provided by the stone-trip-actuator based on a predetermined relationship between the ground-engaging-tool-location-data (or the implement-location-data) and the one or more trip-locations.

The actuator-control-signal may be configured to decrease the bias force that is provided by the stone-trip-actuator based on the result of a comparison between (i) the difference between the ground-engaging-tool-location-data (or the implement-location-data) and a trip-location, and (ii) a distance-threshold.

The agricultural implement may be a plough, which may include a plough body.

The actuator may comprise a plough-width-adjustment actuator for moving the plough body in a lateral direction.

The actuator may comprise a depth-adjustment actuator for adjusting the working depth of the plough body.

The plough may also include a skimmer. The actuator may comprise a skimmer-actuator for adjusting the working depth of the skimmer.

The actuator may comprise: a drive-actuator that provides a motive force to the plough; and/or a steering-actuator that controls the direction of travel of the plough.

There is also disclosed a computer-implemented method of operating an agricultural system, the agricultural system comprising:
a plough, the plough comprising:
a plough body;
a stone-trip-mechanism that is configured to be tripped when the plough body encounters a stone or other obstruction;
a trip-sensor configured to provide trip-data in response to the stone-trip-mechanism being tripped; and
a location-determining-system associated with the plough, wherein the location-determining-system is configured to provide location-data that is representative of a location of the plough;
the method comprising:
receiving the trip-data when the stone-trip-mechanism is tripped; and
storing location-data provided by the location-determining-system as a trip-location, based on the trip-data, wherein the trip-location is a location of the plough at the time that the stone-trip-mechanism is tripped.

There is also disclosed a computer-implemented method of operating an agricultural system, the agricultural system comprising:
an agricultural implement, the agricultural implement comprising:
an actuator configured to control operation of the agricultural implement;
a location-determining-system associated with the agricultural implement, wherein the location-determining-system is configured to provide implement-location-data that is representative of a current location of the agricultural implement; and
the method comprising:
receiving one or more trip-locations, wherein the one or more trip-locations are locations of a plough at a time that a stone-trip-mechanism has tripped in an earlier agricultural operation;
receiving the implement-location-data; and
providing an actuator-control-signal to the actuator in order to control the operation of the actuator based on the implement-location-data and the one or more trip-locations.

There is also disclosed an agricultural system comprising:
an agricultural implement, the agricultural implement comprising:
a ground engaging tool;
a sensor configured to provide event-data based on operation of the agricultural implement;

a location-determining-system associated with the agricultural implement, wherein the location-determining-system is configured to provide location-data; and
   a controller that is configured to:
   receive the event-data;
   store location-data provided by the location-determining-system as an event-location, wherein the event-location is a location of the agricultural implement at the time that the event-data was recorded.

There is also disclosed an agricultural system comprising:
an agricultural implement, the agricultural implement comprising:
   an actuator configured to control operation of the agricultural implement;
   a location-determining-system associated with the agricultural implement, wherein the location-determining-system is configured to provide implement-location-data that is representative of a current location of the agricultural implement; and
   a controller that is configured to:
   receive one or more event-locations;
   receive the implement-location-data;
   process the implement-location-data and the one or more event-locations in order to provide an actuator-control-signal to the actuator for controlling the operation of the actuator.

There is also disclosed a computer-implemented method of operating an agricultural system, the agricultural system comprising:
an agricultural implement, the agricultural implement comprising:
   a ground engaging tool;
   a sensor configured to provide event-data based on operation of the agricultural implement;
   a location-determining-system associated with the agricultural implement, wherein the location-determining-system is configured to provide location-data; and
   the method comprising:
   receiving the event-data;
   storing location-data provided by the location-determining-system as an event-location, wherein the event-location is a location of the agricultural implement at the time that the event-data was recorded.

There is also disclosed a computer-implemented method of operating an agricultural system, the agricultural system comprising:
an agricultural implement, the agricultural implement comprising:
   an actuator configured to control operation of the agricultural implement;
   a location-determining-system associated with the agricultural implement, wherein the location-determining-system is configured to provide implement-location-data that is representative of a current location of the agricultural implement; and
   the method comprising:
   receiving one or more event-locations;
   receiving the implement-location-data;
   providing an actuator-control-signal to the actuator for controlling the operation of the actuator based on the implement-location-data and the one or more event-locations.

The agricultural implement may be a plough. The ground engaging tool may be a plough body or a skimmer.

There may be provided a computer program, which when run on a computer, causes the computer to configure any apparatus, including a system, a controller, or a processor disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present disclosure will now be described by way of example only, with reference to the accompanying drawings, in which.

DETAILED DESCRIPTION OF THE DRAWINGS

Figure 1A:
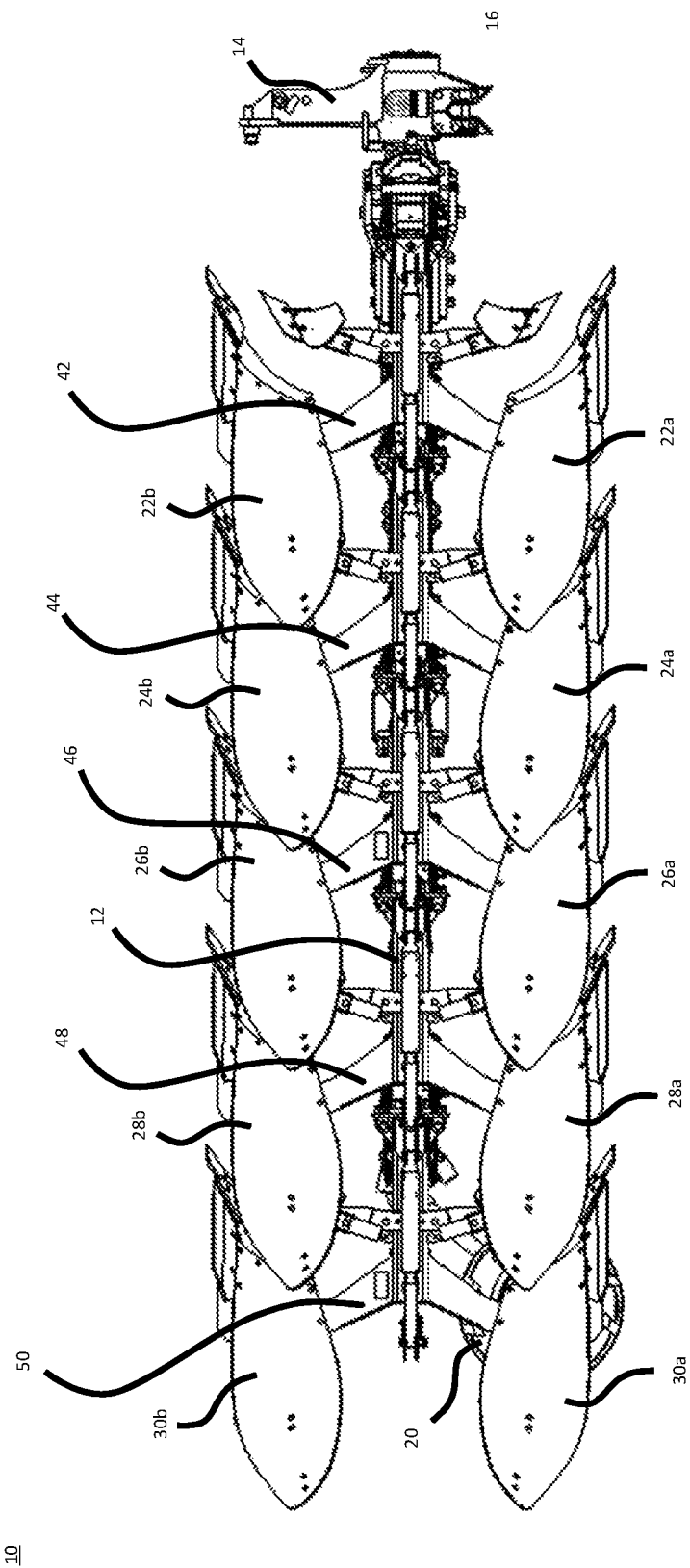
FIG. 1A shows a right-side view of an agricultural implement with fixed ground engaging tools.
Figure 1B:
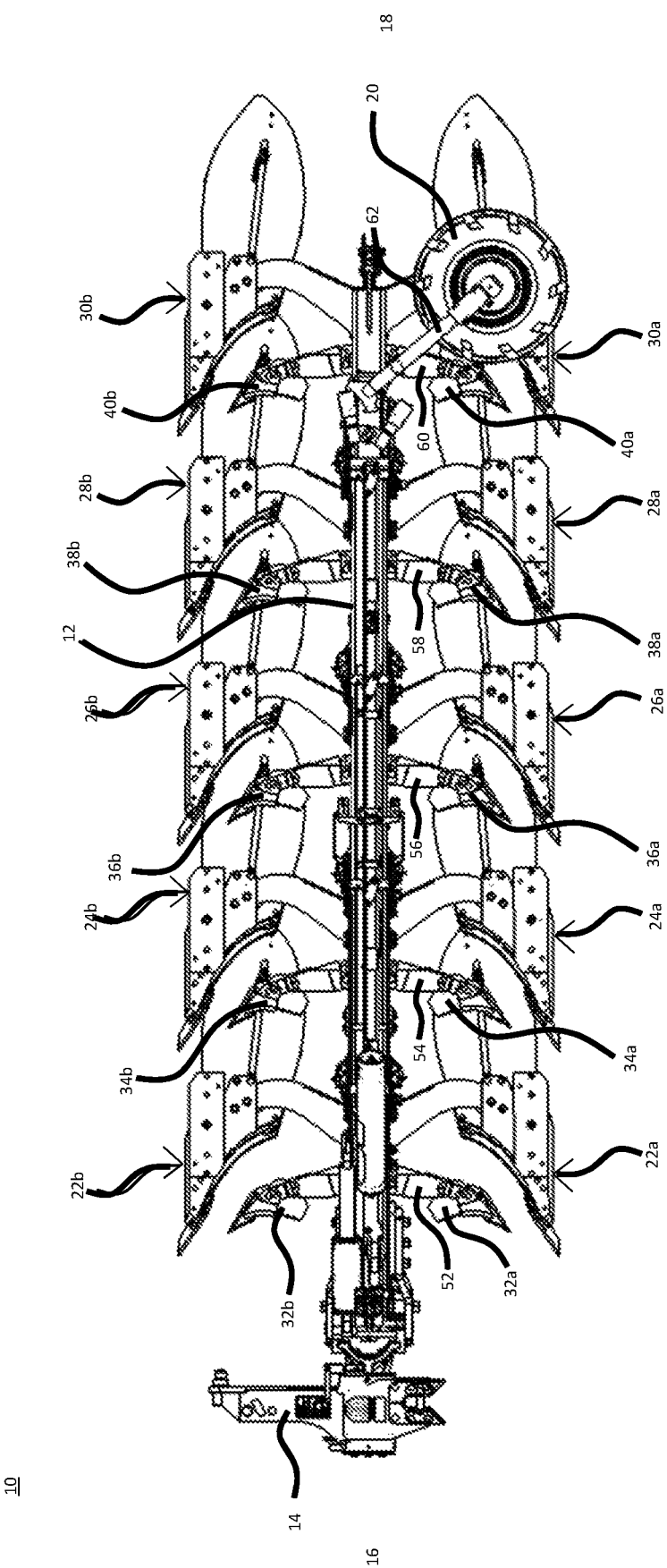
FIG. 1B shows a left-side view of the agricultural implement shown in FIG. 1A.
Figure 1C:
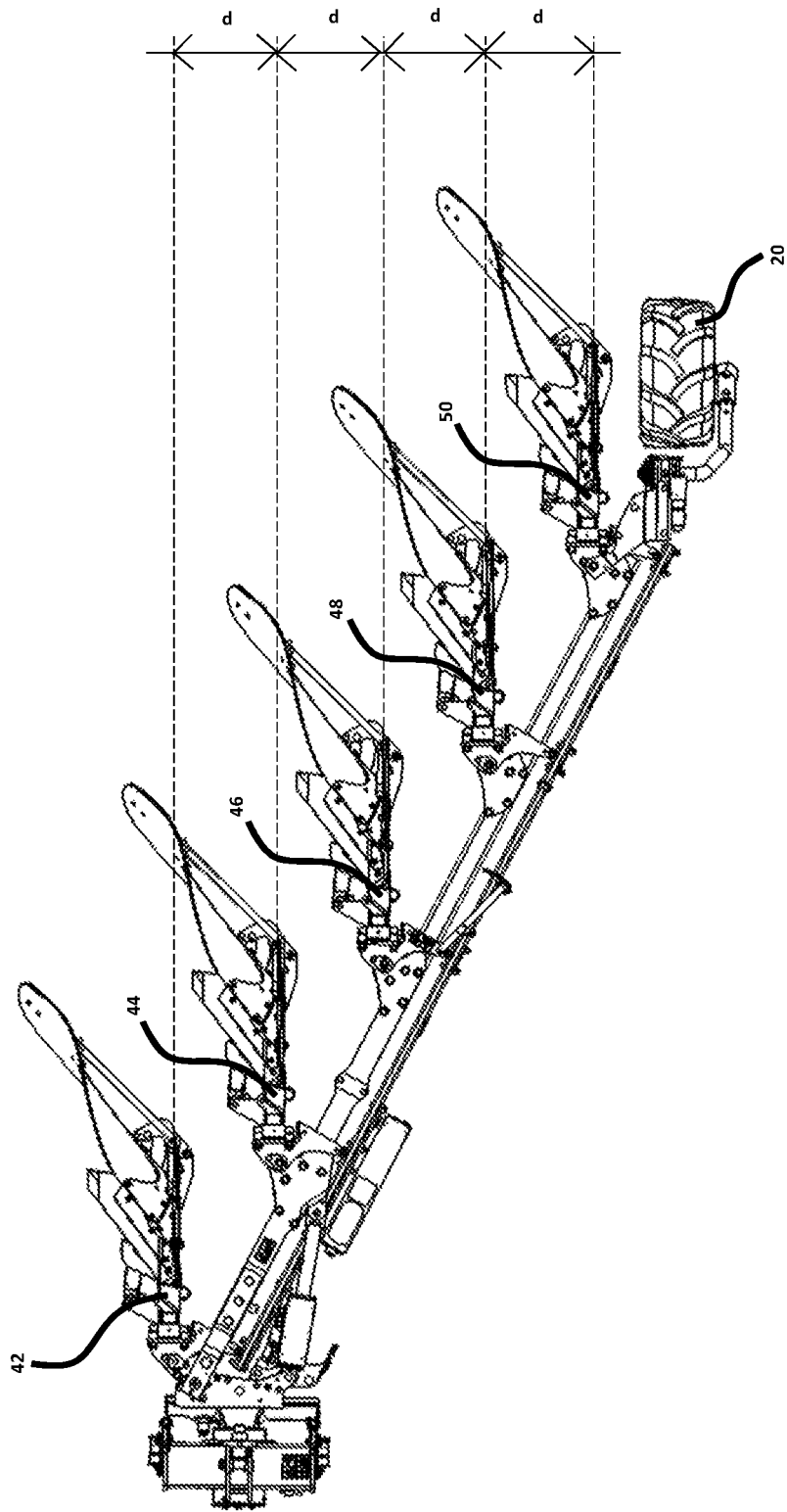
FIG. 1C shows a plan view of the agricultural implement shown in FIG. 1A.

FIGS. 1A to 1C show various views of an agricultural implement, particularly a plough 10. As will be described in more detail below, the plough 10 shown in FIGS. 1A to 1C is a reversible plough.

The plough 10 comprises a main frame 12. The main frame 12 may be a rectangular or round tube extending between a headstock 14 at a front end 16 of the plough towards a depth wheel 20 at a rear end 18 of the plough. The main frame 12 supports a variety of ground-engaging tools.

In the example of FIGS. 1A to 1C, the ground engaging tools include plough bodies 22a, 22b, 24a, 24b, 26a, 26b, 28a, 28b, 30a, 30b and plough skimmers 32a, 32b, 34a, 34b, 36a, 36b, 38a, 38b, 40a, 40b. A plurality of first ground engaging tools, i.e. plough bodies 22a, 24a, 26a, 28a, 30a and skimmers 32a, 34a, 36a, 38a, and 40a, are arranged on a first side of the main frame 12. In a first configuration of the main frame 12, illustrated in FIGS. 1A to 1C, the plurality of first ground engaging tools are arranged below the main frame 12.

A plurality of second ground engaging tools, i.e. plough bodies 22b, 24b, 26b, 28b, 30b and skimmers 32b, 34b, 36b, 38b, and 40b, are arranged on a second side of the main frame 12, opposite to the plurality of first ground engaging tools. In the first configuration of the main frame 12, illustrated in FIGS. 1A to 1C, the plurality of second ground engaging tools are arranged above the main frame.

Each of the plough bodies 22a, 22b, 24a, 24b, 26a, 26b, 28a, 28b, 30a, 30b is connected to the main frame 12 by means of beams 42, 44, 46, 48, 50. Each of the beams 42, 44, 46, 48, 50 has a substantially Y-shaped structure.

A first beam 42 supports a first pair of plough bodies 22a, 22b. A second beam 44 supports a second pair of plough bodies 24a, 24b. A third beam 46 supports a third pair of plough bodies 26a, 26b. A fourth beam 48 supports a fourth pair of plough bodies 28a, 28b. A fifth beam 50 supports a fifth pair of plough bodies 30a, 30b.

Each of the pairs of plough bodies 22a, 22b, 24a, 24b, 26a, 26b, 28a, 28b, 30a, 30b is designed to create a furrow in the field when the plough is dragged behind or pushed by an agricultural vehicle such as a tractor. It follows that each run of the illustrated plough 10 through a field creates five adjacent furrows.

Figure 2:
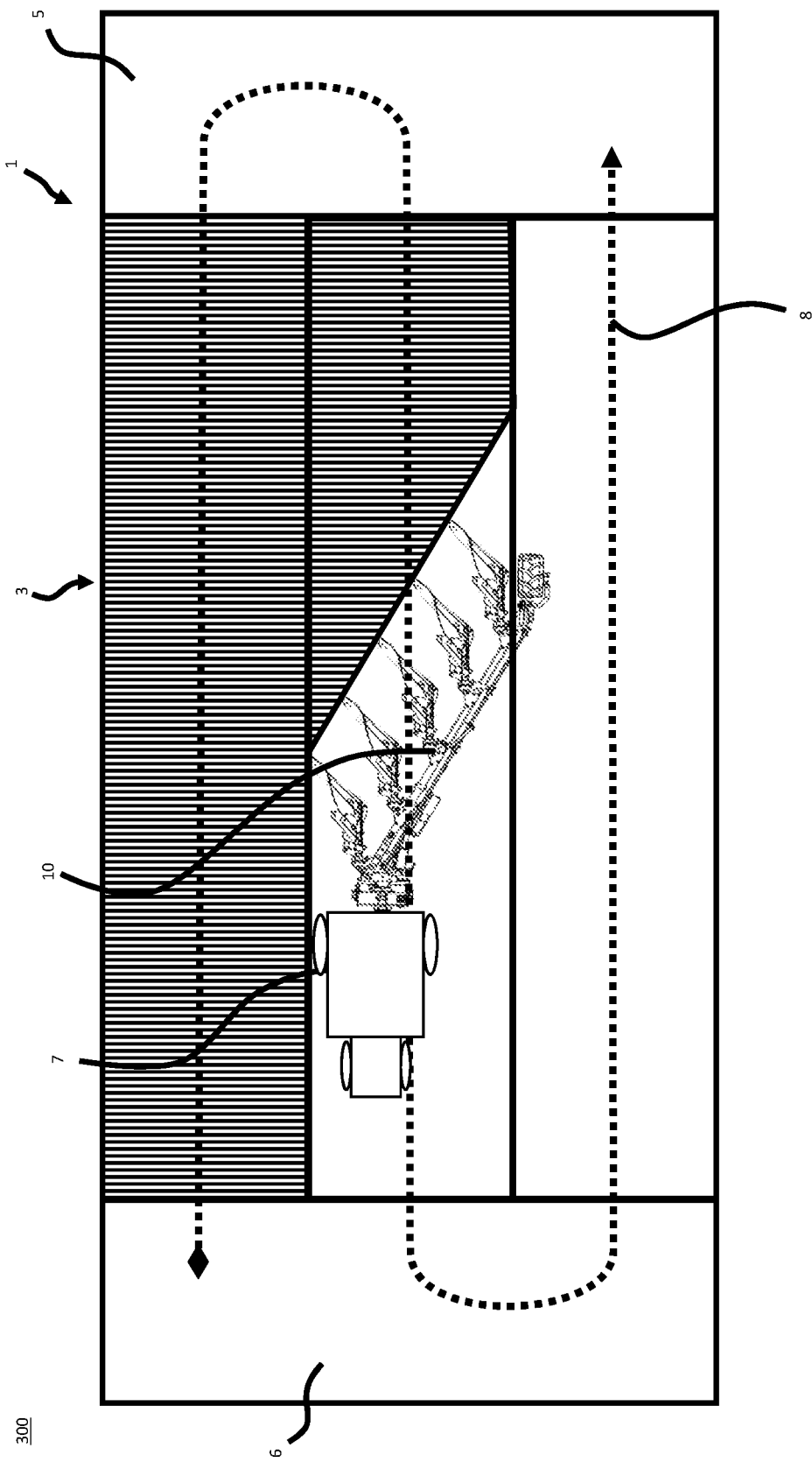
FIG. 2 shows a schematic representation of the trajectory of an agricultural machinery within a work area.

Turning to FIG. 2, a typical operation of an agricultural machinery comprising a tractor 7 and a plough 10 is described. In use, the plough 10 is drawn as an attachment (implement) behind an agricultural towing vehicle (e.g. tractor 7). It will be appreciated that it is equivalently feasible to locate the plough 10 in front of or both in front of and behind the tractor 7.

FIG. 2 shows a schematic work area 1, e.g. a crop field, which is divided into a main field 3 and headlands 5,6. A tractor 7 draws the plough 10 across the main field 3 in generally parallel working rows. The working rows are part of the trajectory 8 of the tractor 7 and typically run in parallel with a long edge of the work area 1. Each working row represents an individual run of the agricultural machinery across the field between headlands 5 and 6. As will be described in more detail below, a five-furrow plough, such as the exemplary plough shown in FIGS. 1A to 1C creates a total of five furrows per run.

At the end of each run/working row, the tractor 7 and plough 10 use the upcoming headland 5 or 6 for turning around, as indicated by trajectory 8. It is known in the art that the soil of the headlands 5, 6 is subject to greater levels of soil compaction as it receives more traffic per unit area than the main field 3. In order not to disturb the soil of the headlands 5, 6 more than necessary, it is known to lift the ground engaging tools, such as the plough bodies and the skimmers, off the ground into a headland or transfer position, just before the plough 10 reaches the headlands 5 or 6 respectively. Once the tractor 7 and the corresponding plough 10 have turned on the headland 5, 6, the ground engaging tools of the plough 10 are, again, lowered towards an operating position to engage the soil of the main field 3.

In the illustration of FIG. 2, the plough 10 is working on the main field 3 and, therefore, is arranged in the operating position. As the plough 10 reaches the border between the headland 5/6 and the main field 3, the plough 10 is transferred to a headland/transfer position. It follows that each working row starts with an adjustment of the plough from the transfer position into the operating position and ends with an adjustment of the plough from the operating position into the transfer position.

The plough 10 shown in FIGS. 1A to 1C is of the fully-mounted type. In fully-mounted ploughs, the weight of the plough is carried exclusively by the tractor when the plough is in its transfer position (on the headlands). In other words, the plough is then exclusively supported by the tractor 7 via headstock 14 and may be lifted off the ground with a lift cylinder of a tractor linkage.

During the turning movement on the headlands, the plough 10 is also reversed. That is, the main frame 12 is rotated by 180 degrees with respect to the headstock 14 to move the plough from a first configuration to a second configuration. In its first configuration shown in FIGS. 1A to 1C, the plough 10 is set up such that plough bodies 22a, 24a, 26a, 28a, and 30a of each of the pairs are in contact with the soil. This first configuration is shown in FIG. 2 and sometimes referred to as the "right turning configuration", since the mouldboards of the plough bodies 22a, 24a, 26a, 28a and 30a are arranged to move the soil sideways from left to right when viewed in the direction of travel. In its second configuration (not illustrated), the plough 10 is set up such that plough bodies 22b, 24b, 26b, 28b, and 30b of each of the pairs are in contact with the soil. This second configuration is achieved after rotating the main frame by 180 degrees, such that the majority of plough bodies are arranged to the right of the tractor (not shown). It follows that the second configuration is also referred to as the "left turning configuration".

Tilling the field with the plough 10 in this first configuration provides a first furrow created by the first plough body 22a, a second furrow created by the second plough body 24a, a third furrow created by the third plough body 26a, a fourth furrow created by the fourth plough body 28a, and a fifth furrow created by the fifth plough body 30a. A furrow width is determined by the lateral distance d between the plough bodies 22a, 22b, 24a, 24b, 26a, 26b, 28a, 28b, 30a, 30b, as illustrated in FIG. 1C.

As the reversible plough 10 reaches the end of the first run, the main frame 12 is rotated by 180 degrees (reversed) with respect to the headstock 14. A turning cylinder (not shown), attached to the headstock 14 may be used to rotate (reverse) the plough 10. During rotation of the main frame, the first plurality of plough bodies, e.g. 22a, 24a, 26a, 28a, 30a, are transferred to the top of the plough 10. At the same time, the second plurality of plough bodies e.g. 22b, 24b, 26b, 28b, 30b, which were not in use in the previous run, is then transferred to the lower end of the plough 10 and will be submerged in the soil during the next run. The reversible plough is then in its second configuration (not shown).

Executing a second run of the field with the plough 10 in this second configuration provides a first furrow created by the sixth plough body 22b, a second furrow created by the seventh plough body 24b, a third furrow created by the eighth plough body 26b, a fourth furrow created by the ninth plough body 28b, and a fifth furrow created by the tenth plough body 30b.

Reversing the plough 10 between consecutive runs has the advantage that the plough bodies 22a, 22b, 24a, 24b, 26a, 26b, 28a, 28b, 30a, 30b that engage the soil always face the same side edge of the main field 3, irrespective of the tractor's orientation.

In both configurations of the plough 10 the main frame 12 is supported by a depth wheel 20. The depth wheel 20 is arranged at the back end 18 of the plough 10. Since the plough bodies 22a, 22b, 24a, 24b, 26a, 26b, 28a, 28b, 30a, 30b and the skimmers 32a, 32b, 34a, 34b, 36a, 36b, 38a, 38b, 40a, 40b are generally fixed to the main frame via beams 42, 44 46, 48 and 50, there is no possibility of adjusting the working depth of said ground engaging tools without changing the ground clearance of the main frame 12. To this end, the plough 10 shown in FIGS. 1A to 1C includes depth wheel 20, which acts as a depth wheel to adjust the ground clearance of the main frame 12. A linkage provided between the depth wheel 20 and the main frame 12 allows the operator to lift or lower the main frame 12 with respect to a ground surface 80. Since the position of the plurality of first and second ground engaging tools is fixed with respect to the main frame 12, any change in the main frame's ground clearance will also affect the working depth of the plurality first and second ground engaging tools. In particular, if the main frame 12 is lowered by adjusting the link between the depth wheel 20 and the main frame 12, then the working depth of the plurality of first ground engaging tools shown in FIGS. 1A to 1C is increased, i.e. the plurality of first ground engaging tools are lowered further into the soil. If, on the other hand, the main frame 12 is lifted, then the working depth of the plurality of first ground engaging tools is decreased, i.e. the plurality of first ground engagement tools are pulled out of the soil.

Figure 3A:
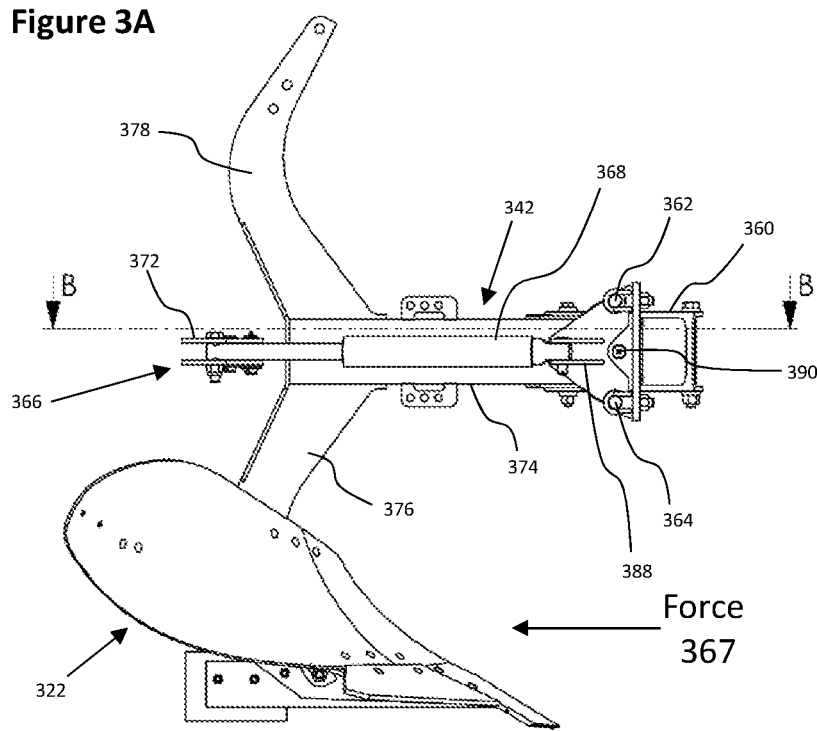
FIGS. 3A, 3B and 3C illustrate part of a plough that includes a stone trip mechanism for a plough body and a beam, where the plough body is in a working position.
Figure 3B:
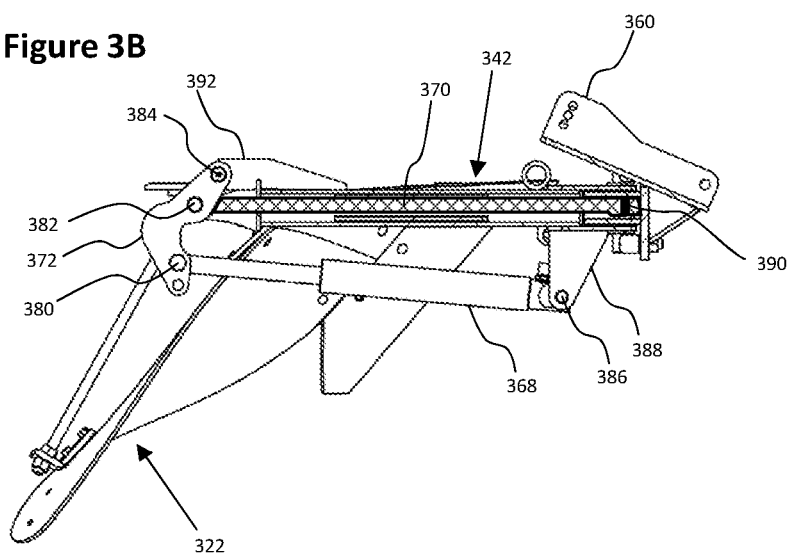
Figure 3C:
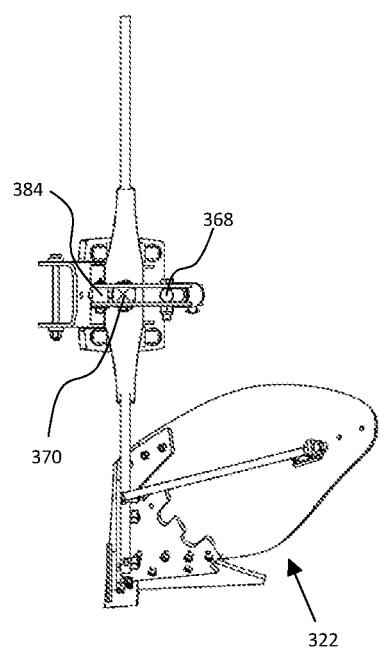
Figure 4A:
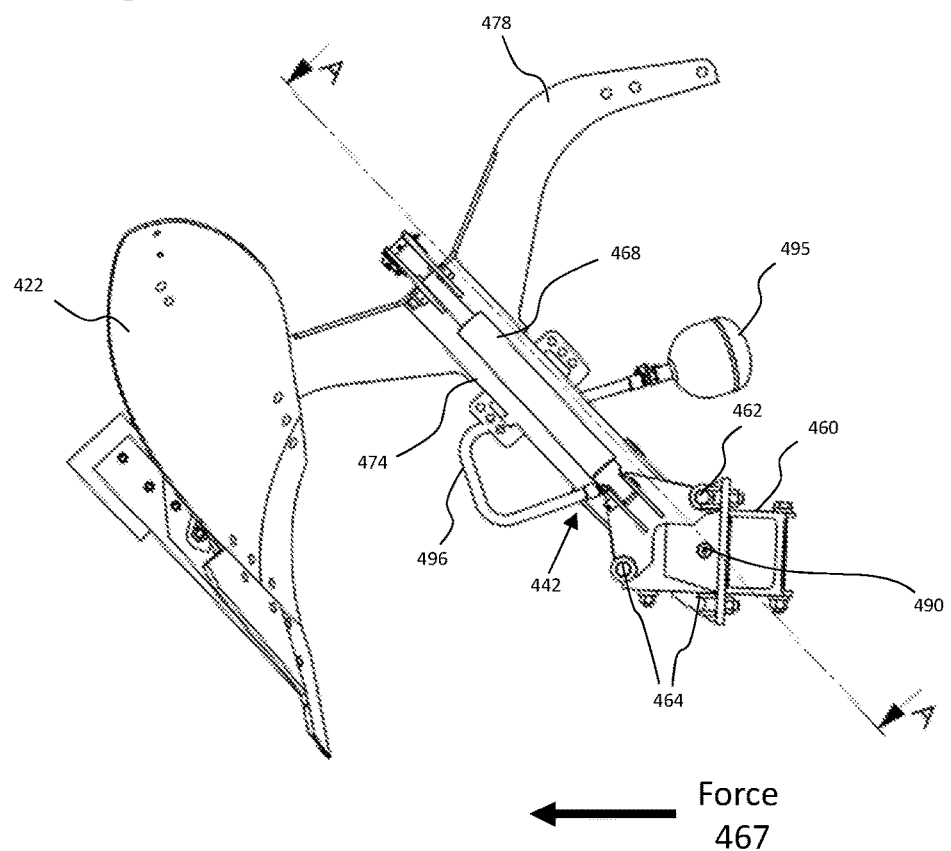
FIGS. 4A, 4B and 4C are corresponding views of the part of the plough of FIGS. 3A-3C that illustrate the stone trip mechanism where the plough body is in a tripped position.
Figure 4B:
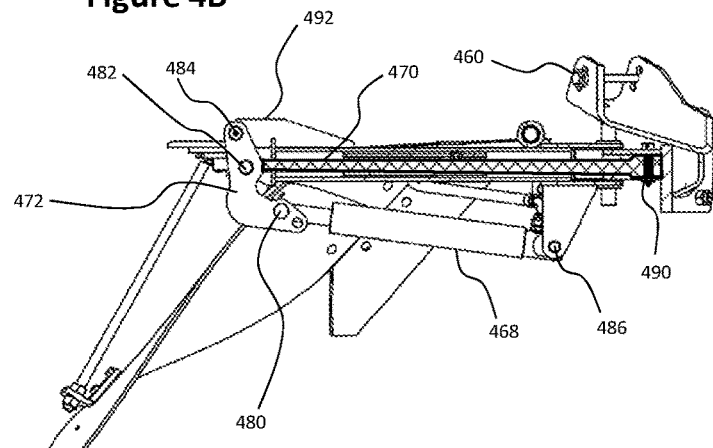
Figure 4C:
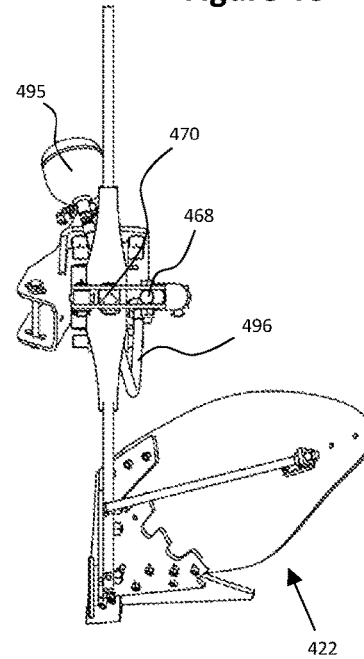

FIGS. 3A, 3B and 3C illustrate part of a plough that includes a stone trip mechanism for a plough body 322 and a beam 342, where the plough body 322 is in a working position. FIG. 3A shows a side view, FIG. 3B shows a cross-sectional view along the line B-B in FIG. 3A, and FIG. 3C shows an end view from a distal end of the beam 342. FIGS. 4A, 4B and 4C are corresponding views that illustrate the stone trip mechanism where the plough body is in a tripped position, as will be described below.

The beam 342 connects the plough body 322 to a frame (not shown) of a reversible plough. The plough body 322 is an example of a first ground engaging tool. These figures show a beam housing 360 that provides a mechanical connection between the beam 342 and the frame. The beam 342 is pivotally connected to the beam housing 360, and therefore is also pivotally connected to the frame. As will be discussed below, the beam housing 360 has two hinge points 362, 364, one of which is usable for each of the first and second configurations of the reversible plough.

The beam 342 has a substantially Y-shaped structure, which includes a central portion 374, a first beam arm 376 and a second beam arm 378. The central portion 374 of the beam 342 has a proximal end that is pivotally connected to the beam housing 360, and a distal end. The two beam arms 376, 378 extend from the distal end of the beam 342. The first beam arm 376 connects the plough body 322 to the central portion 374 of the beam 342. The second beam arm 378 connects a second plough body (not shown to assist with the clarity of the illustration) to the central portion 374 of the beam 342. The plough body 322 can be used to engage the soil and work the field when the reversible plough is in the first configuration. The second plough body (not shown) can be used to engage the soil and work the field when the reversible plough is in the second configuration.

FIGS. 3A, 3B and 3C also show an actuator mechanism 366 that provides a bias force to the beam 342 such that the plough body 322 is biased towards the working position. In this way, the bias force can be indirectly applied to the plough body by the actuator mechanism 366 applying a force to a beam that is mechanically connected to the plough body. The actuator mechanism shown in these figures can also be referred to as a stone trip mechanism. The bias force can be set such that when the plough body 322 is being pulled through soil as the plough is working the field, the plough body 322 maintains its intended orientation. That is, the bias force applied by the actuator mechanism 366 overcomes the reactive force 367 experienced by the plough body as it moves through the soil. However, if the plough body 322 were to hit a stone or other obstruction buried under the ground, then the additional force that is applied to the plough body by the stone is able to overcome the bias force applied by the actuator mechanism such that the beam 342 can pivot about one of the hinge points 362, 364. It will be appreciated that any reference to a stone in this document, can more generally relate to any obstruction that is experienced by a plough or other agricultural implement. When the beam 342 pivots in this way, the plough body 322 moves upwards as shown in FIGS. 4A to 4C such that it is above the stone. Therefore, the ploughing operation does not need to stop when a stone is experienced by the plough body 322. Once the plough body 322 has passed the stone, the bias force applied by the actuator mechanism returns the plough body 322 to its working position.

The actuator mechanism 366 includes a cylinder 368, a connection bar 370 and a linkage 372. The connection bar 370 in this example is mainly located in a cavity that is inside the central portion 374 of the beam 342. In this way, the central portion 374 of the beam 342 can be considered as a sleeve around the connection bar 370. Most of the length of the connection bar 370 is visible in the cross-sectional view of FIG. 3B, and an end of the connection bar 370 is also visible in FIG. 3C. In FIG. 3A, the connection bar 370 is obscured by the cylinder 368 and the beam 342.

In this example, the beam 342 includes a cylinder mounting region (lug) 388 at the proximal end of the central portion 374 of the beam 342, and a linkage mounting region (lug) 392 at the distal end of the central portion 374 of the beam 342. As shown in FIG. 3B, the cylinder mounting region 388 and the linkage mounting region 392 extend from opposite sides of the beam 342 such that they are laterally offset from each other at opposite ends of the connection bar 370.

A first end of the linkage 372 is connected to the linkage mounting region 392 at a linkage-beam connection point 384. In this way, the first end of the linkage 372 can rotate relative to the beam 342, but cannot experience a translational movement relative to the beam 342. A second end of the linkage 372 is connected to a first end of the cylinder 368 at a linkage-cylinder connection point 380. A second end of the cylinder 368 is connected to the cylinder mounting region 388 at a cylinder-beam connection point 386. A first end of the connection bar 370 is connected to the beam housing 360 (and therefore also the frame) at a bar-frame connection point 390. A second end of the connection bar 370 is pivotally connected to a mid-point of the linkage 372 at a bar-linkage connection point 382. That is, the bar-linkage connection point 382 is between the linkage-beam pivot point 384 and the linkage-cylinder connection point 380, along a longitudinal direction of the linkage 372.

In this example, the linkage-beam connection point 384, the linkage-cylinder connection point 380, the cylinder-beam connection point 386, the bar-frame connection point 390 and the bar-linkage connection point 382 are all pivot points such that the two associated components are rotatable relative to each other. It will be appreciated that in other examples, one or more of these connection points can be rigid connections that do not allow for relative rotational movement, and that any non-linear or rotational movement can be accommodated by other components in the actuator mechanism 366.

An accumulator (not shown in FIGS. 3A-3C) maintains a pressure of the fluid in the cylinder 368 when the ground engaging tool 322 is in its working position. The pressure in the cylinder 368 attempts to push the second end of the linkage 372 away from the cylinder mounting region 388, such that it would rotate about the bar-linkage connection point 382 and push the linkage-beam pivot point 384 back towards the beam housing 360. In this way, the central portion 374 of the beam 342 is biased along the connection bar such that it abuts the beam housing 360. Therefore, the bias force applied by the cylinder 368 acts to maintain the beam 342 in its current, working, position with respect to the beam housing 360.

FIGS. 4A, 4B and 4C illustrate the stone trip mechanism where the plough body 422 is in a tripped position. Features of FIGS. 4A and 4C that are also shown in FIGS. 3A to 3C will be given corresponding reference numbers in the 400 series, and will not necessarily be described again. FIGS. 4A and 4C also show an accumulator 495 that is connected to the cylinder 468 by a hose 496, such that it maintains the pressure of the fluid in the cylinder 468.

In FIGS. 4A to 4C, the plough body 422 has encountered a stone, which has resulted in a high reactive force 467 on the plough body 422 when it was in its working position. As will be discussed below, this high reactive force 467 is larger than the bias force that is provided by the cylinder 468 such that the beam 442 has pivoted about the first hinge point 462, and the plough body 422 has moved out of the way of the stone. More particularly, since the reactive force 467 will always be experienced by the lower, in-use, plough body, the beam 442 will always pivot about the upper hinge point. Therefore, if the plough were in the second configuration such that the second beam arm 478 were facing downwards, the beam 442 would pivot about the second hinge point 464 (which would be the upper hinge point) upon experiencing a stone.

As the beam 442 pivots about first hinge point 462, the second hinge point 464 separates and part of the beam 442 moves away from the beam housing 460. The first end of the connection bar 470 is connected to the beam housing 460 at the bar-frame connection point 490, such that the central portion 474 of the beam 442 moves along the connection bar 470 towards the linkage 472. Since the second end of the connection bar 470 is connected to a mid-point of the linkage 472 at a bar-linkage connection point 482, the linkage 472 rotates about the bar-linkage connection point 482. As the linkage 472 rotates, the second end of the linkage 472 (and therefore also the linkage-cylinder connection point 480) moves closer to the cylinder-beam connection point 486. As the linkage-cylinder connection point 480 moves closer to the cylinder-beam connection point 486, the cylinder 468 is compressed. In this way, the beam 442 is only able to rotate about the first hinge point 462 when the reactive force 467 on the plough body 422 results in a force on the cylinder 468 applied by the linkage 472, that is greater than the bias force that is provided by the fluid in the cylinder 468.

Figure 5:
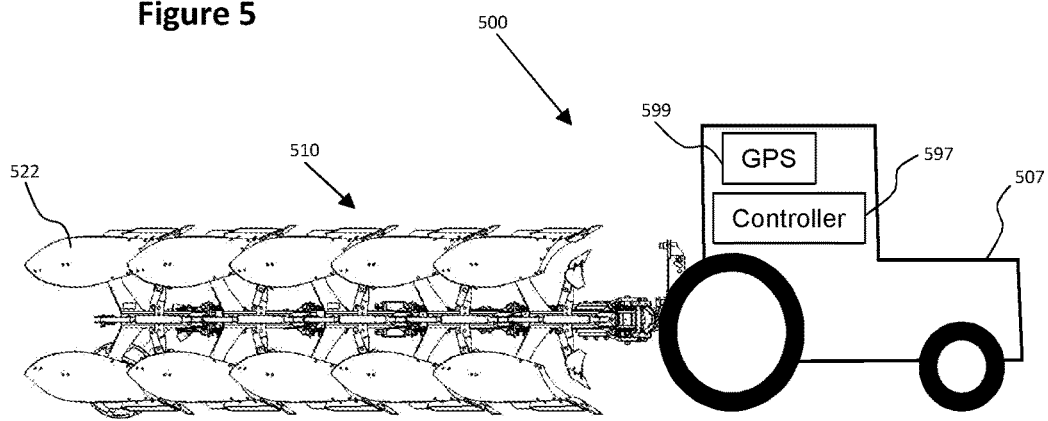
FIG. 5 shows an example of an agricultural system according to the present disclosure.

FIG. 5 shows an example of an agricultural system 500 according to the present disclosure. The agricultural system 500 includes a plough 510 and a tractor 507. In this example the tractor 507 is towing the plough 510, although it could also push the plough 510. The agricultural system 500 includes a location-determining-system 599 and a controller 597. In this example the location-determining-system 599 is a GPS. The location-determining-system 599 and the controller 597 are shown in FIG. 5 as located on the tractor 507. However, it will be appreciated from the description that follows that the location-determining-system 599 and/or the controller 597 can instead be located on the plough 510. Also, the functionality of the controller 597 can be provided by one or more processors that are collocated with one or both of the plough 510 and the tractor 507, or can be located remotely from the tractor 507 and the plough 510.

In this example, the plough 510 includes one or more trip-sensors (not shown), which can provide trip-data. A trip-sensor can provide the trip-data to the controller 597. The trip-sensor can directly or indirectly monitor the position of one or more, or all, of the plough bodies 522 and/or the speed with which a plough body 522 leaves it's working position.

The trip-data can be provided to the controller 597 in response to the stone-trip-mechanism being tripped, live as it is determined, in some examples. In other examples the trip-data may be stored in a memory that is in electronic communication with the trip-sensor, and then passed on to the controller 597 for processing later on. In such an example, a timestamp associated with the trip-data may also be stored in the memory. Then, the controller 597 may receive an entire field's worth of trip-data at the end of the ploughing operation.

The location-determining-system 599 can provide location-data to the controller 597. In some examples, the location-determining-system can be associated with the plough 510 and/or the tractor 507. Again, the location-determining-system 599 can provide location-data to the controller 597 live as the plough 510 moves around a field, or can be stored in a memory along with associated timestamps for subsequent communication on the controller 597.

The controller 597 can apply a mathematical operation to the received location-data to determine one or more plough-body-locations, which represent the location of one or more of the individual plough bodies 522 of the plough 510. For instance, the controller 597 can use a predetermined offset between: (i) the location of the location-determining-system 599; and (ii) the location of one or more of the individual plough bodies 522 to determine a plough-body-location. The controller 597 may also use the direction of travel of the location-determining-system 599/tractor 507 to apply the offsets in the correct direction. In this way a single location-determining-system 599 can be used for a plurality of plough bodies 522. Alternatively, a location-determining-system can be provided for a single plough body 522.

In some examples, the location-determining-system 599 can include a path transmitter or a speed sensor (as non-limiting examples of additional components) that can be used with a GPS to obtain more accurate location data.

When the controller 597 receives trip-data from the trip-sensor, it can store the associated location-data in memory as a trip-location. In examples where the location-data and trip-data are stored in memory along with associated timestamps, the controller can determine the location-data that is associated with received trip-data by looking up the location of the tractor/plough at the time that the trip occurred. In some examples, the controller 597 can determine which of a plurality of plough bodies 522 have been tripped based on the trip-data. For instance, the trip-data may include a plough-body-identifier that indicates which plough body has been tripped. Then, the controller 597 can determine plough-body-trip-locations (which are the location of the specific plough bodies that have been tripped) based on the received location-data. A plough-body-trip-location is an example of a trip-location. In this way, the memory can store geographical information that relates to where in a field the stone-trip-mechanism has tripped, and therefore can identify the location of stones/obstructions in the field. In some examples the controller 597 can also store a trip-identifier in the memory. The trip-identifier can be a unique identifier that is associated with a trip-location that is stored in the memory.

Advantageously, the trip-locations (such as the plough-body-trip-locations) that are stored in memory can be used to generate a map of the field in which the plough 510 was working. The map can include identifiers for the locations of stones/obstacles based on the trip-locations in the memory. The map can be used manually or automatically for a subsequent agricultural operation in the field such that the stones/obstructions can be taken into account. For examples, a route through the field can be generated to avoid the stones/obstructions. Also, one or more operating parameters of an agricultural machine can be manually or automatically controlled during the subsequent agricultural operation to account for the locations of the stones/obstructions. Further details are provided below.

In some examples, the trip-data may simply take a binary value that indicates whether or not a trip has occurred. For example, the trip-data may be set to a value of '1' when a trip occurs. Such a trip may be detected by a sensor that determines that the plough body has moved by more than a threshold amount against the bias force of the stone trip mechanism. Such a sensor may be associated with a cylinder of the stone trip mechanism. In this way, the trip-data may be implemented as simple flag. Alternatively, the trip-data may take one of a plurality values when a trip occurs. For instance, the trip-data may be referred to as trip-depth-data that represents the depth of a plough body during the trip. In one example, the trip-depth-data may be provided by a sensor that monitors the position of the cylinder that forms part of the stone trip mechanism. In this way, the trip-data can represent the depth of the stone, which can be useful in a subsequent agricultural operation as will be discussed below.

In examples where the trip-data includes trip-depth-data, a controller can beneficially generate a three-dimensional map of subterranean obstacles in the field which includes the depth of each obstacle.

In some examples, the controller 597 can process the trip-data and store one or more of the following examples of a trip-location in memory:
- trip-start-location, which is the location-data provided by the location-determining-system 599 when a trip begins;
- trip-stop-location, which is the location-data provided by the location-determining-system 599 when a trip ends;
- plough-body-trip-start-location, which is the plough-body-location (as determined from the location-data provided by the location-determining-system 599) of a plough body when a trip begins; and
- plough-body-trip-stop-location, which is the plough-body-location (as determined from the location-data provided by the location-determining-system 599) of a plough body when a trip ends.

Optionally, the controller 597 can group a plurality of individual trip-locations together such that they are associated with the same stone/obstruction. For instance, if two trip-locations are less than a threshold-distance apart, then the controller 597 may group them together as being associated with the same stone/obstruction. The controller 597 can then attribute the same stone-identifier to each of the trip-locations that are grouped together. In this way, multiple trip-locations that are less than the threshold-distance from at least one other trip-location are all grouped together with the same stone-identifier. In some applications, the controller 597 can process the trip-locations that are all associated with the same stone-identifier in order to determine one or more stone-coordinates that define the periphery of the stone or obstruction. Additionally or alternatively, the controller 597 can determine stone-coordinates using trip-start-location and trip-stop-location (or plough-body-trip-start-location and plough-body-trip-stop-location).

Figure 6:
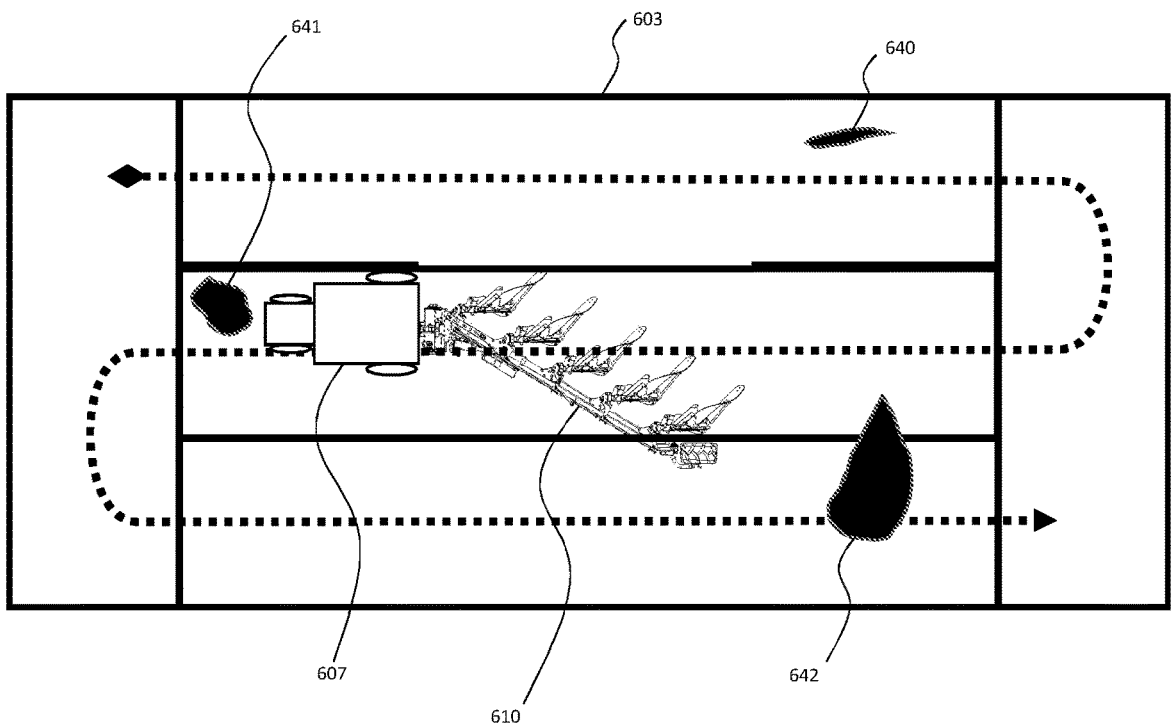
FIG. 6 illustrates schematically how stored trip-locations can be used in a subsequent agricultural operation.

FIG. 6 illustrates schematically how stored trip-locations can be used in a subsequent agricultural operation. FIG. 6 illustrates a ploughing operation as the subsequent agricultural operation. It will be appreciated that in other examples different types subsequent agricultural operation can be performed, including any other type of tillage operation, a baling operation, and a harvesting operation, as non-limiting examples.

FIG. 6 shows a field 603, in which three subterranean stones (or other obstructions) 640, 641, 642 are located. As discussed above, an earlier ploughing operation in the field has caused the stone-trip-mechanisms on the plough to trip when the plough bodies encountered the stones 640, 641, 642. The locations of the plough bodies when the associated stone-trip-mechanisms were tripped is stored in memory as trip-locations. These trip-locations can be displayed on a map in the cab of the tractor 607. The map may display the same information that is shown in FIG. 6, optionally including a current location of the tractor 607 and the plough 610. This can assist the operator in visualising where the stones/obstructions are while they are working the field.

Figure 7:
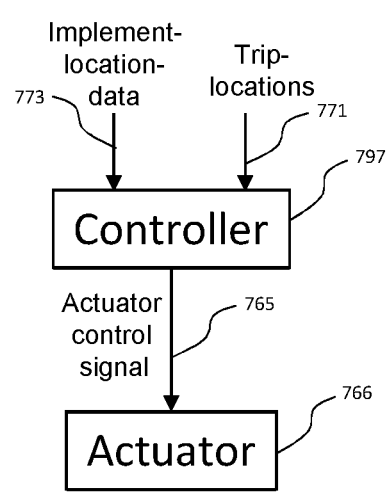
FIG. 7 schematically shows part of an agricultural system, which includes an agricultural implement such as a plough, that can be used to perform the subsequent agricultural operation.

FIG. 7 schematically shows part of an agricultural system, which includes an agricultural implement such as a plough, that can be used to perform the subsequent agricultural operation. The agricultural system includes a controller 797 and an actuator 766. The actuator 766 can be any component that controls operation of the agricultural implement. In one example, the actuator 766 can be part of a stone-trip-mechanism that provides a bias force to a plough body such that it is biased towards a working position. The actuator 766 can be the same as the one described with reference to FIGS. 3A, 3B, 3C, 4A, 4B and 4C, or could be different. Examples of other actuators 766 that can be used are described below.

The controller 797 receives implement-location-data 773 and one or more trip-locations 771 from memory. The implement-location-data 773 is representative of a current location of the agricultural implement. The implement-location-data can be received from a location-determining-system that is associated with the agricultural implement and/or an associated agricultural vehicle in the same way as described above. The controller 797 can process the implement-location-data 773 and the one or more trip-locations 771 stored in memory to determine whether or not to provide an actuator-control-signal 765 to the actuator 766. The actuator-control-signal 765 is operable to control the operation of the actuator 766

In an example where the actuator 766 is a stone-trip-actuator, such as the actuator mechanism 366 of FIG. 3, the actuator-control-signal 765 can decrease the bias force that is provided by the stone-trip-actuator based on a predetermined relationship between the implement-location-data 773 and a trip-location 771. An example of such a predetermined relationship is the result of a comparison between (i) the difference between the implement-location-data 773 and a trip-location 771, and (ii) a distance-threshold. In some examples, the controller 797 can determine, and take into account, a direction of travel of the agricultural implement as part of the predetermined relationship to determine whether or not a collision is likely, and therefore whether or not to decrease the bias force. If such a relationship is satisfied, then the agricultural implement can be considered as being in the vicinity of a stone/obstruction. It can be advantageous to decrease the bias force in advance of an expected collision with the stone/obstacle such that the ground engaging tool can trip more easily. This can reduce the likelihood of the ground engaging tool being damaged by the stone/obstacle.

In this way, the controller 797 provides an actuator-control-signal 765 to the actuator 766 in order to automatically set the level of the bias force that is provided by the actuator 766. In this way, the actuator 766 can be set such that the performance of the agricultural implement is improved. For instance, in examples where the actuator 766 is a stone trip mechanism for a plough, the stone trip mechanism can be controlled such that it trips at an appropriate reactive force that is experienced by the plough body. This can involve charging the accumulator that is shown in FIG. 4A such that it sets a level of the pressure in the cylinder based on a trip-location 771. In this way: (i) it can be easier for the stone-trip-mechanism to trip when it encounters a stone in a known location, which reduces the likelihood of the plough body being damaged; (ii) it may reduce the likelihood of a false trip occurring, when no stone is present; and/or (iii) it may reduce the likelihood that the plough body does not trip when a stone is encountered.

The controller 797 can process the implement-location-data 773 and one or more trip-locations 771 such that the controller automatically decreases the bias force applied by a stone-trip-mechanism in a predetermined (virtual) area. If the bias force is reduced so much that the reactive force experienced by the plough body as it moves through the soil is greater than the bias force, then the plough body will be automatically raised such that the plough body's working depth is reduced in order for the plough body to avoid a stone (or other obstacle such as a drainage well) rather than hitting it. Alternatively, if the bias force is not greater than the reactive force (but is nonetheless reduced), then the stone-trip-mechanism can trip more easily when the plough body does encounter a stone.

The trip-locations 771 can be considered as defining virtual forbidden areas in the field. The actuator 766 can be considered as operating as a section control that enables a plough body to be extracted from the soil such that it is dragged along on the surface at specific locations in the field, in order to improve the quality of the agricultural operation and/or reduce the likelihood of the plough body being damaged.

Examples of other actuators 766 that can be automatically controlled by an actuator-control-signal 765 include:

A plough-width-adjustment actuator (70, FIG. 1C) for moving the plough bodies in a lateral direction. The plough-width-adjustment actuator can move one or more of the plough bodies in a lateral direction either individually or together. In some instances, this can enable a plough body to be proactively moved out of the way of stone/obstruction that is represented by a trip-location.

A depth-adjustment actuator for adjusting the working depth of one or more of the plurality of plough bodies. This could be the hydraulic cylinder connected to the linkage 62 provided between the implement wheel 20 and the main frame 12, shown in FIG. 1B. The depth-adjustment actuator may also include a linkage on the tractor, which can adjust the height of the front end of the plough relative to the tractor. Alternatively, this could be hydraulic actuators arranged between one or more plough bodies and the main frame to individually adjust a distance between those plough bodies and the main frame. The depth-adjustment actuator can adjust the working depth of one or more of the plough bodies either individually or together. Again, this can enable a plough body to be proactively moved out of the way of a stone/obstruction that is represented by a trip-location. In examples where the trip-data includes trip-depth-data, the depth-adjustment actuator can be controlled such that the working depth of one or more plough bodies is reduced so that they are shallower than the depth of the obstacle.

A roll-over actuator for reversing the agricultural implement. Although not specifically derivable from any of the figures, such a roll-over actuator may be a hydraulic cylinder arranged on the headstock of the agricultural implement and suitable for transferring (i.e. reversing) the reversible plough implement between its first and its second configuration described above. In some examples, the roll-over actuator can be controlled such that the working depth of the plough bodies is reduced in the vicinity of a stone/obstruction.

A skimmer-actuator for adjusting the working depth of one or more of the skimmers. This can enable a skimmer to be proactively moved out of the way of a stone/obstruction that is represented by a trip-location.

A plough-body-angle-actuator for adjusting the angle of attack of a plough body. This can enable an angle of attack of a plough body to be reduced when approaching a stone so that the plough body can more easily the raised in the soil to avoid the stone.

A drive-actuator that provides a motive force to the agricultural implement. The drive actuator can be an engine of a tractor that is towing or pushing the agricultural implement, or an engine or motor that is located on a self-propelled agricultural implement. For instance, the actuator-control-signal 765 can cause the agricultural implement to slow down in the vicinity of a stone/obstruction in order to reduce the likelihood of the agricultural implement being damaged by the stone/obstruction. This can be especially useful if the agricultural implement is being driven autonomously.

A steering-actuator that controls the direction of travel of the agricultural implement. The steering-actuator can be associated with a tractor that is towing or pushing the agricultural implement, or can be located on the agricultural implement. For instance, the actuator-control-signal 765 can cause the agricultural implement to steer around a stone/obstruction in order to reduce the likelihood of the agricultural implement being damaged by the stone/obstruction. This can also be especially useful if the agricultural implement is being driven autonomously.

Figure 8:
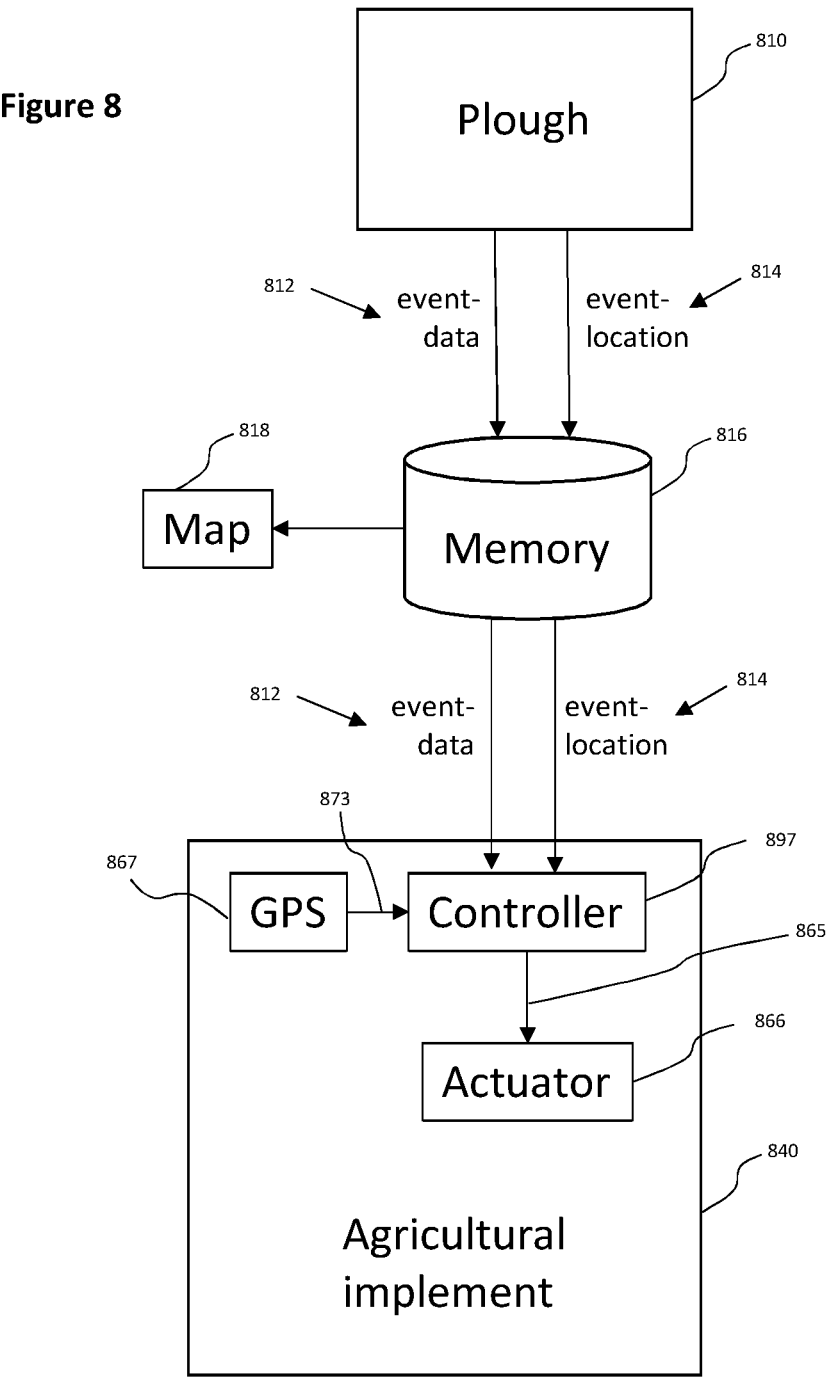
FIG. 8 illustrates another example of an agricultural system of the present disclosure.

FIG. 8 illustrates another example of an agricultural system of the present disclosure. FIG. 8 shows a plough 810 that provides event-data 812 and an associated event-location 814 to memory 816. The memory 816 may be collocated with the plough 810, or may be remote from it. For example, the plough may provide the event-data 812 and the event-location 814 to the memory 816 over a network such as the internet. Optionally, a controller (not shown) can generate a map 818 from the event-data 812 and the associated event-location 814 that are stored in memory 816.

An agricultural implement 840 can retrieve event-data 812 and event-location 814 from memory, and use that data to control an actuator 866 associated with the agricultural implement 840. In a similar way to the controller of FIG. 7, a controller 897 associated with the agricultural implement 840 can process the event-data 812 and event-location 814, along with implement-location-data 873 (such as provided by a GPS 867), in order to provide an actuator-control-signal 865 to the actuator 866. The agricultural implement 840 can be any type of agricultural implement, and may or may not be a plough. The actuator 866 can be any known type of actuator for adjusting an operating parameter of the agricultural implement 840, including the ones disclosed elsewhere in this document.

One example of event-data 812 is trip-data, and an example of the associated event-location is the trip-location, as described above. However, in this example, the event-data is not limited to only trip events. Other types of events that can be recorded instead of, or in addition to, trip events include:

- a shear-bolt-failure-event and associated shear-bolt-failure-location. A shear bolt in the plough 810 may break when the plough 810 experiences a challenging environment, or if a plough body experiences a stone/obstruction that does not cause the stone-trip-mechanism to trip.
- a wheel-slip-event that is triggered when a wheel-slip-sensor measures a degree of wheel slip experienced by a wheel of the agricultural implement and/or an associated agricultural vehicle is greater than a threshold amount.
- a soil-condition-event when a soil-condition exceeds a soil-threshold. For instance, a soil-sensor can provide soil-data, which is representative of one or more characteristics of the soil that is to be worked by the agricultural implement. Non-limiting examples include:
  - a soil-moisture-event that is triggered when measured soil-moisture-data exceeds a threshold. The soil-moisture-data is representative of the moisture level of the soil. An example implementation of a soil-moisture-sensor is a microwave radar. One or more actuators 866 of the agricultural implement 840 can be automatically controlled to improve the operation of the agricultural implement 840 for particularly wet soil.
  - a soil-compaction-event that is triggered when measured soil-compaction-data exceeds a threshold. The soil-compaction-data is representative of the compaction/density of the soil. A radar is one example of a sensor that can provide soil-compaction-data. One or more actuators 866 of the agricultural implement 840 can be automatically controlled to improve the operation of the agricultural implement 840 for particularly compacted soil.
  - a predicted-soil-compaction-event that relates to the location of the wheels or tracks of an agricultural vehicle as it moves through a field. Such an event can be triggered whenever an agricultural vehicle moves through a field. This can be especially relevant when the agricultural vehicle is a heavy one, such as a combine harvester, because this will significantly affect the compaction of the soil. Such predicted-soil-compaction-event need not necessarily directly measure properties of the soil, but instead can be triggered by the location of the agricultural vehicle based on an assumption that the agricultural vehicle will compact the soil.
- a crop-related-event when a crop-related-condition exceeds a crop-threshold. For instance, a crop-sensor can provide crop-data, which is representative of one or more characteristics of crop that has been processed by the agricultural implement. Non-limiting examples include:
  - a crop-residue-event that is triggered when measured crop-residue-data exceeds a threshold. The crop-residue-data is representative of a property of crop residue that that is left on the soil after an agricultural operation. A radar or camera are two examples of sensors that can provide crop-residue-data. One or more actuators 866 of the agricultural implement 840 can be automatically controlled to improve the operation of the agricultural implement 840 for particularly compacted soil.
  - a harvested-crop-event that is triggered when an amount of harvested crop exceeds a high-threshold or drops below a low-threshold. If there is a relatively low harvest rate in a certain area, then it can be considered as relating to one or more of: lack of nutrients; lack of sufficient soil depth for good root development, weed presence. One or more of these potential reasons can be affected by the plough depth and or furrow width. The furrow width and/or the furrow depth can affect: how the soil turns and falls apart, and how big a portion of the (weed) roots are cut-off by the plough share.

It can be beneficial to record the location of such events in memory. For instance, an operator of an agricultural implement 840 that performs a subsequent agricultural operation can consult an associated map 818, and take special care when approaching a location where an event has previously occurred.

Additionally or alternatively, the controller 897 can process the above types of event-data in one or more of the following ways:

- to cause a drive-actuator to slow down the agricultural implement 840, such as when it is approaching a location at which a shear bolt was previously broken, as identified by a shear-bolt-failure-event;
- to cause a drive-actuator to slow down the agricultural implement 840, such as when it is approaching a location at which wheel slip previously occurred, as identified by a wheel-slip-event;
- to set the bias force applied by a stone-trip-actuator. This can be based on the wheel-slip-data, for instance using an equation or a look-up-table, or applying one or more wheel-slip-thresholds. In this way, higher bias forces can be applied for higher degrees of wheel slip on the basis that a reactive force experienced by the ground working tool could be contributing to restricting the forward movement of the agricultural implement and therefore also the undesired wheel slip. The reactive force (drag) experienced by the plough body can be lower when it's in the working position. If the plough body starts to trip (and is angled with respect to its working position) then a higher reactive (drag) force can occur due to a more aggressive angle of the body in to the soil;

to set the bias force applied by a stone-trip-actuator. This can be based on the soil-moisture-data, for instance using an equation or a look-up-table, or applying one or more soil-moisture-thresholds. In this way, lower bias forces can be applied for higher moisture soils on the basis that the reactive force experienced by the ground working tool is expected to be lower for relatively wet soil;

to set the bias force applied by a stone-trip-actuator. This can be based on the soil-compaction-data, for instance using an equation or a look-up-table, or applying one or more soil-compaction-thresholds. In this way, higher bias forces can be applied for more compact/dense soils on the basis that the reactive force experienced by the ground working tool is expected to be higher for relatively dense soil;

to set the working depth and/or angle of one or more skimmers. This can be based on the crop-residue-data, for example to increase the working depth of the skimmers if the crop-residue-data exceeds a threshold in order to improve increase the amount of residue that is buried. By changing the angle of the skimmer, the residues can be placed in an improved way, such as in the bottom of the furrow. For instance, if distance d is increased in FIG. 1C, then the residues will need to travel a longer distance to reach the furrow bottom created by the body in front of the skimmer. This can be accomplished by automatically setting a more aggressive angle of the skimmer relative to the direction of travel. If the amount of reside (as represented by the crop-residue-data) is too high, for example greater than a threshold), then it can be an advantage to automatically change the angle of the skimmer to improve the dynamic behaviour of the soil/residue flow;

to set the plough depth and/or furrow width based on a harvested-crop-event. As discussed above, the reasons for a low amount of harvested crop can be affected by the plough depth and or furrow width;

to control whether or not an operation is performed at a location. For example, using trip-depth-data, the controller 897 can determine whether or not the operation (such as drilling, planting, or any type of tilling) requires a depth that is greater than depth of the obstacle (as represented by the trip-depth-data). If the required depth of the operation is greater than the trip-depth-data, then the controller 897 may provide an actuator-control-signal 865 to the actuator 866 that prevents it from performing its operation at that location.

It will be appreciated that for each of the above examples, the objective of automatically controlling an actuator 866 is to improve the performance of the operation that is performed by the agricultural implement based on the locations of previously recorded events and/or previously recorded operating conditions. When the actuator 866 is a stone-trip-actuator, this can include setting the bias force to reduce the number of false trip events (when no stone or other obstacle is encountered), to reduce the number of times that the actuator mechanism does not trip when it does encounter a stone, and or to reduce the number of times that a plough body is damaged by a stone/obstruction. Furthermore, it can be an objective to set the bias force such that the ground engaging tool is in its correct working position when no stone is encountered. That is, the "normal" reactive force that is experienced by the ground engaging tool when no stone is encountered should not result in prolonged trip events.

In some examples, the controller 897 can set the level of the bias force that is provided by the actuator 866 such that that it does not exceed a maximum-force-value and/or it does not drop below a minimum-force-value. Especially in relation to the maximum-force-value, this can ensure that the bias force does not get so high that the plough body breaks when it experiences a stone, rather than causing a trip event.

One or more of the above thresholds may be settable by a user based such that they are appropriate for the field that is being worked by the agricultural implement. For examples where there is a first-threshold and a second-threshold, these thresholds may be the same as each other, or different.

Figure 9:
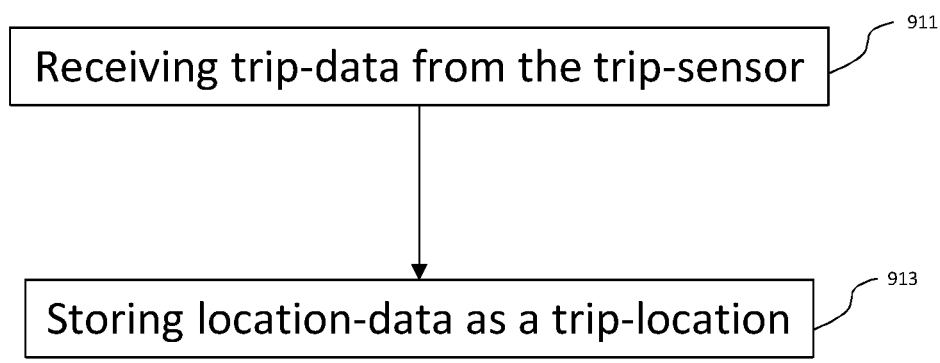
FIG. 9 illustrates schematically a method of operating an agricultural system.

FIG. 9 illustrates schematically a method of operating an agricultural system. As discussed above, the agricultural system can include a plough having a plough body. The agricultural system can also include a stone-trip-mechanism, a trip-sensor, and a location-determining-system associated with the plough.

At step 911, the method includes receiving trip-data from the trip-sensor, which is indicative of when the stone-trip-mechanism is tripped. At step 913, the method includes storing location-data provided by the location-determining-system as a trip-location. The trip-location is a location of the plough at the time that the stone-trip-mechanism is tripped.

The method of FIG. 9 can advantageously enable the locations of stones or other obstacles that are encountered by the plough to be stored in memory. In this way, a subsequent agricultural operation in the field can be performed more effectively by taking into account the locations of the stones/obstacles.

Optionally, the method of FIG. 9 can also include generating a map based on the stored trip-locations.

Figure 10:
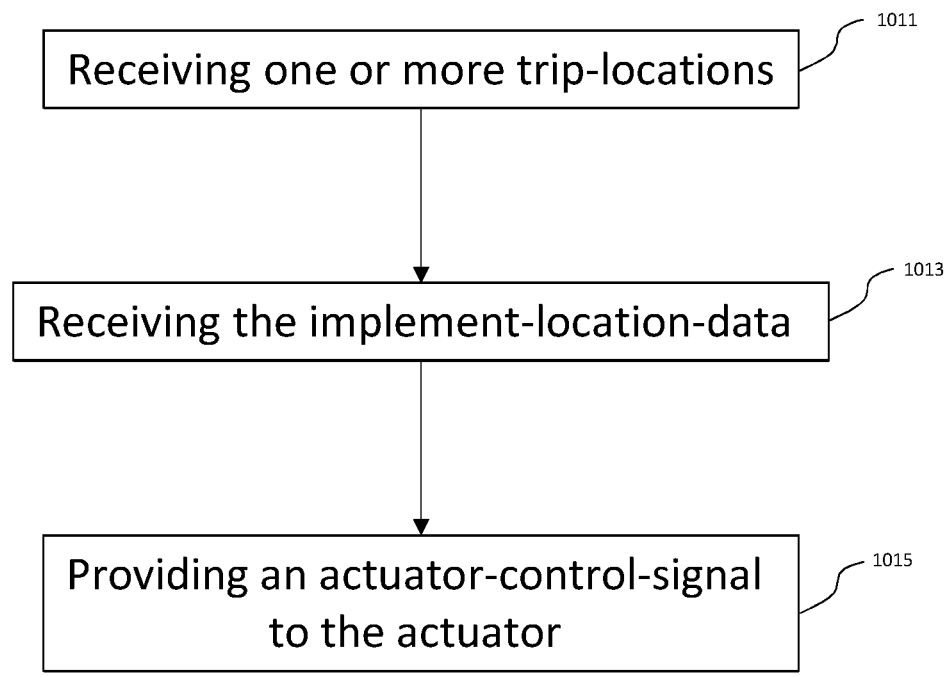
FIG. 10 illustrates schematically another method of operating an agricultural system.

FIG. 10 illustrates schematically another method of operating an agricultural system. As discussed above, the agricultural system can include an agricultural implement. The agricultural implement includes an actuator for controlling operation of the agricultural implement. The agricultural system also includes a location-determining-system, which is associated with the agricultural implement. The location-determining-system can provide implement-location-data that is representative of a current location of the agricultural implement.

At step 1011, the method includes receiving one or more trip-locations. The one or more trip-locations are locations of a plough at a time that a stone-trip-mechanism has tripped in an earlier agricultural operation. The one or more trip-locations can be retrieved from a memory that was written following the earlier agricultural operation.

At step 1013, the method involves receiving the implement-location-data from the location-determining-system.

At step 1015, the method involves processing the implement-location-data and the one or more trip-locations and providing an actuator-control-signal to the actuator in order to control the operation of the actuator. As discussed above, this can advantageously improve the performance of the agricultural implement because it can take into account the locations at which the stone-trip-mechanism tripped in the earlier agricultural operation.

Although some aspects of this detailed description make reference to plough bodies, it should be appreciated that at least some examples of the present disclosure are not limited to such ground engaging tools. Rather, in some implementations, any form of ground engaging tool of any agricultural implement may be used in connection with the actuator mechanism and controller described above. Similarly, the number and arrangement of the ground engaging tools shown in the Figures should not be understood to be limiting to the scope of this disclosure.

Preferences and options for a given aspect, feature or parameter of the invention should, unless the context indicates otherwise, be regarded as having been disclosed in combination with any and all preferences and options for all other aspects, features and parameters of the disclosure.

The invention claimed is:

1. An agricultural system comprising:
 a plough comprising:
  a plough body;
  a stone trip mechanism that is configured to be tripped when the plough body encounters a stone or other obstruction; and
  a trip sensor configured to provide trip data in response to the stone trip mechanism being tripped;
 a location determining system associated with the plough, wherein the location determining system is configured to provide location data that is representative of a location of the plough; and
 a controller configured to:
  receive the trip data;
  store the location data provided by the location determining system as a trip location based on the trip data, wherein the trip location is a location of the plough at a time that the stone trip mechanism is tripped; and
  determine if two trip locations are less than a threshold distance apart, and if the two trip locations are less than the threshold distance apart, attribute a same stone identifier to each of the two trip locations.

2. The agricultural system of claim 1, wherein the stone trip mechanism is configured to apply a bias force to the plough body such that the plough body is biased toward a working position.

3. The agricultural system of claim 1, wherein the trip sensor is configured to directly or indirectly monitor a position of the plough body and/or a speed with which the plough body leaves a working position in order to provide the trip data.

4. The agricultural system of claim 1, wherein the controller is configured to:
 determine a plough body location based on the trip location, wherein the plough body location represents the location of the plough body at the time that the stone trip mechanism is tripped; and
 store the plough body location.

5. The agricultural system of claim 1, wherein the trip data comprises trip depth data, which represents a depth of the plough body during the trip.

6. An agricultural system comprising:
 a plough comprising:
  a plough body;
  at least one actuator configured to control operation of the plough;
  a location determining system associated with the plough, wherein the location determining system is configured to provide implement location data that is representative of a current location of the plough; and
 a controller that is configured to:
  receive one or more trip locations, wherein the one or more trip locations are one or more plough locations at a time that a stone trip mechanism has tripped in an earlier agricultural operation;
  receive the implement location data; and
  process the implement location data and the one or more trip locations in order to provide at least one actuator control signal to the at least one actuator in order to control the operation of the at least one actuator;
 wherein the at least one actuator comprises a stone trip actuator configured to apply a bias force to the plough body such that the plough body is biased toward a working position, the controller is configured to determine a ground engaging tool location based on the implement location data, the ground engaging tool location represents a current location of the plough body, the controller is configured to process the ground engaging tool location and the one or more trip locations in order to provide a stone trip actuator control signal of the at least one actuator control signal to the stone trip actuator to control the operation of the stone trip actuator, and the stone trip actuator control signal is configured to decrease the bias force that is provided by the stone trip actuator based on a predetermined relationship between the ground engaging tool location and the one or more trip locations.

7. The agricultural system of claim 6, wherein:
 the stone trip actuator control signal is configured to decrease the bias force that is provided by the stone trip actuator based on a result of a comparison between (i) a difference between the ground engaging tool location and a trip location of the one or more trip locations, and (ii) a distance threshold.

8. The agricultural system of claim 6, wherein the at least one actuator comprises:
 a plough width adjustment actuator configured to move the plough body in a lateral direction; and/or
 a depth adjustment actuator configured to adjust a working depth of the plough body.

9. The agricultural system of claim 6, wherein:
 the plough also includes a skimmer; and
 the at least one actuator comprises a skimmer actuator configured to adjust a working depth of the skimmer.

10. The agricultural system of claim 7, wherein the at least one actuator comprises:
 a drive actuator that provides a motive force to the plough; and/or
 a steering actuator that controls a direction of travel of the plough.

11. A method of operating an agricultural system, comprising:
 receiving, via a controller, trip data from a trip sensor in response to a stone trip mechanism being tripped, wherein the stone trip mechanism is configured to be tripped when a plough body of a plough encounters a stone or other obstruction; and
 storing, via the controller, location data representative of a location of the plough provided by a location determining system associated with the plough as a trip location based on the trip data, wherein the trip location is a location of the plough at a time that the stone trip mechanism is tripped; and
 determining, via the controller, if two trip locations are less than a threshold distance apart, and if the two trip locations are less than the threshold distance apart, attributing, via the controller, a same stone identifier to each of the two trip locations.

12. A method of operating an agricultural system, comprising:
- receiving, via a controller, one or more trip locations, wherein the one or more trip locations are plough locations at a time that a stone trip mechanism has tripped in an earlier agricultural operation;
- receiving, via the controller, implement location data from a location determining system associated with a plough, wherein the implement location data is representative of a current location of the plough; and
- providing, via the controller, an at least one actuator control signal to at least one actuator configured to control operation of the plough in order to control the operation of the actuator based on the implement location data and the one or more trip locations;
- wherein the at least one actuator comprises a stone trip actuator configured to apply a bias force to a plough body of the plough such that the plough body is biased toward a working position, the method comprises determining, via the controller, a ground engaging tool location based on the implement location data, the ground engaging tool location represents a current location of the plough body, the method comprises processing, via the controller, the ground engaging tool location and the one or more trip locations in order to provide a stone trip actuator control signal of the at least one actuator control signal to the stone trip actuator to control the operation of the stone trip actuator, and the stone trip actuator control signal is configured to decrease the bias force that is provided by the stone trip actuator based on a predetermined relationship between the ground engaging tool location and the one or more trip locations.

* * * * *